(12) United States Patent
Thier (10) Patent No.: US 7,756,901 B2
(45) Date of Patent: Jul. 13, 2010

(54) HORIZONTAL ENTERPRISE PLANNING IN ACCORDANCE WITH AN ENTERPRISE PLANNING MODEL

(75) Inventor: Adam Thier, Eden Prairie, MN (US)

(73) Assignee: International Business Machines Corporation, Armonk, NY (US)

( * ) Notice: Subject to any disclaimer, the term of this patent is extended or adjusted under 35 U.S.C. 154(b) by 1736 days.

(21) Appl. No.: 10/370,182

(22) Filed: Feb. 19, 2003

(65) Prior Publication Data

US 2004/0162743 A1    Aug. 19, 2004

(51) Int. Cl.
G06F 17/00    (2006.01)

(52) U.S. Cl. ............... 707/802; 707/809; 707/810; 707/812; 705/1; 705/10

(58) Field of Classification Search .......... 707/101, 707/102, 103 R, 999.1, 999.101, 999.107, 707/103; 705/1, 7, 10

See application file for complete search history.

(56) References Cited

U.S. PATENT DOCUMENTS

| | | | |
|---|---|---|---|
| 5,172,313 | A | 12/1992 | Schumacher |
| 5,381,332 | A | 1/1995 | Wood |
| 5,406,477 | A | 4/1995 | Harhen |
| 5,461,699 | A | 10/1995 | Arbabi et al. |
| 5,524,253 | A | 6/1996 | Pham et al. |
| 5,774,868 | A | 6/1998 | Cragun et al. |
| 5,799,286 | A | 8/1998 | Morgan et al. |
| 5,974,395 | A | 10/1999 | Bellini et al. |
| 6,023,702 | A | 2/2000 | Leisten et al. |
| 6,067,525 | A | 5/2000 | Johnson et al. |
| 6,067,548 | A | 5/2000 | Cheng |
| 6,073,108 | A | 6/2000 | Peterson |
| 6,151,601 | A | 11/2000 | Papierniak et al. |
| 6,161,051 | A | 12/2000 | Hafemann et al. |
| 6,161,103 | A | 12/2000 | Rauer et al. |

(Continued)

FOREIGN PATENT DOCUMENTS

EP    0294187 A2    6/1988

(Continued)

OTHER PUBLICATIONS

Gary Meyer, "eWorkbench: Real-time Tracking of Synchronized Goals," *HR Magazine*, Apr. 2001, pp. 115, 116 and 118.

(Continued)

*Primary Examiner*—Hung Q Pham
(74) *Attorney, Agent, or Firm*—Shumaker & Sieffert, P.A.

(57) ABSTRACT

In general, the invention is directed to enterprise planning techniques for developing an enterprise planning model that incorporate horizontal as well as vertical planning techniques. A subset of analysts associated with a common node of an enterprise hierarchy may define an enterprise planning session for the node that incorporates a plurality of enterprise planning activities. For example, a first analyst may define a sub-model for revenue planning and a second analyst may define a sub-model for salary planning. The enterprise planning system automatically aggregates the sub-models defined by subsets of analysts to obtain an enterprise-wide planning model. In this manner, the set of analysts may define an enterprise planning model that may allow large, diverse organizations to establish planning standards for multiple planning activities across dozens or hundreds of business units.

41 Claims, 5 Drawing Sheets

U.S. PATENT DOCUMENTS

| | | | |
|---|---|---|---|
| 6,169,534 | B1 | 1/2001 | Raffel et al. |
| 6,173,310 | B1 | 1/2001 | Yost et al. |
| 6,182,060 | B1 | 1/2001 | Hedgcock et al. |
| 6,385,301 | B1 | 5/2002 | Nolting et al. |
| 6,385,604 | B1 | 5/2002 | Bakalash et al. |
| 6,397,191 | B1 | 5/2002 | Notani et al. |
| 6,411,936 | B1 | 6/2002 | Sanders |
| 6,418,420 | B1 | 7/2002 | DiGiorgio et al. |
| 6,424,979 | B1 | 7/2002 | Livingston et al. |
| 6,430,539 | B1 | 8/2002 | Lazarus et al. |
| 6,434,544 | B1 | 8/2002 | Bakalash et al. |
| 6,496,831 | B1 | 12/2002 | Baulier et al. |
| 6,687,713 | B2 | 2/2004 | Mattson et al. |
| 2001/0027455 | A1 | 10/2001 | Abulleil et al. |
| 2001/0044738 | A1 | 11/2001 | Elkin et al. |
| 2002/0042755 | A1 | 4/2002 | Kumar et al. |
| 2002/0049701 | A1 | 4/2002 | Nabe et al. |
| 2002/0082892 | A1 | 6/2002 | Raffel et al. |
| 2002/0087523 | A1 | 7/2002 | Sivaraman |
| 2002/0129003 | A1 | 9/2002 | Bakalash et al. |
| 2002/0143755 | A1 | 10/2002 | Wynblatt et al. |
| 2002/0169658 | A1 | 11/2002 | Adler |
| 2003/0018510 | A1 | 1/2003 | Sanches |
| 2003/0074250 | A1* | 4/2003 | Burk ........................ 705/10 |
| 2003/0084053 | A1 | 5/2003 | Govrin et al. |
| 2003/0130877 | A1 | 7/2003 | Farnes et al. |
| 2003/0144894 | A1 | 7/2003 | Robertson et al. |
| 2004/0039625 | A1 | 2/2004 | Malnack et al. |
| 2004/0045014 | A1 | 3/2004 | Radhakrishnan |
| 2004/0064349 | A1* | 4/2004 | Humenansky et al. ......... 705/7 |
| 2004/0128185 | A1 | 7/2004 | Tsai |
| 2004/0143470 | A1 | 7/2004 | Myrick et al. |
| 2004/0186762 | A1 | 9/2004 | Beaven et al. |

FOREIGN PATENT DOCUMENTS

| | | |
|---|---|---|
| JP | 8161395 | 6/1996 |
| JP | 10312416 | 11/1998 |
| JP | 2001043264 | 2/2001 |
| JP | 2001188839 | 7/2001 |
| JP | 2002092282 | 3/2002 |
| WO | WO 94/18620 A1 | 8/1994 |
| WO | WO 96/30852 | 10/1996 |
| WO | WO 02/11041 A1 | 2/2002 |
| WO | WO 02/19224 A1 | 3/2002 |

OTHER PUBLICATIONS

U.S. Appl. No. 09/575,599, entitled "Revenue Forecasting and Sales Force Management Using Statistical Analysis," filed May 22, 2000, Adam Thier.
U.S. Appl. No. 09/628,479, entitled "Budget Planning," filed Jul. 31, 2000, Adam Thier et al.
U.S. Appl. No. 10/370,183, entitled "Cascaded Planning of an Enterprise Planning Model," filed Feb. 19, 2003, Adam Thier.
MacKay Neural Computation, 1992, 4(3): 415-447.
MacKay Neural Computation, 1992, 4(3): 448-472.
MacKay Neural Computation, 1992, 4(5): 720-735.
International Preliminary Examination Report from related Application Serial No. PCT/US04/03455, mailed Apr. 4, 2005 (7 pages).
Adaytum software, www.adaytum.co.uk, Apr. 2, 1998 [retrieved Dec. 20, 2004], pp. 1-25, retrieved from Google.com and archive.org.
International Search Report and Written Opinion from corresponding International Application No. PCT/US04/03455 mailed Dec. 10, 2004 (10 pages).
"Microsoft Press Computer Dictionary," 1997, Microsoft Press; Third Edition, p. 130.
U.S. Appl. No. 10/262,591 entitled "Real-Time Aggregation of Data Within an Enterprise Planning Environment," filed, Sep. 30, 2002, by Adam Thier et al.
U.S. Appl. No. 10/675,909 entitled "Node-Level Modification During Execution of an Enterprise Planning Model," filed, Sep. 30, 2003, by George Duncan Pearson et al.
U.S. Appl. No. 10/262,590 entitled "Selective Deployment of Software Extensions Within an Enterprise Modeling Environment," filed Sep. 30, 2002, by Brian S. Humenansky et al.
U.S. Appl. No. 10/262,606 entitled "Inline Compression of a Network Communication Within an Enterprise Planning Environment," filed Sep. 30, 2002, by Brian S. Humenansky et al.
U.S. Appl. No. 10/262,651 entitled "Deploying Multiple Enterprise Planning Models Across Clusters of Application Servers," filed Sep. 30, 2002, by Brian S. Humenansky et al.
Simon, Gary, "Plan to Throw Away your Spreadsheet!: A product Review of Adaytum Planning", Deloitte & Touche, Apr. 1998 [retrieved Dec. 5, 2005], pp. 1-4, retrieved from: archive.org and www.adaytum.co.uk.
Teach, Edward, "Budgeting and Planning: Planning for the Masses", CFO Magazine, Mar. 2000 [retrieved Dec. 5, 2005], pp. 1-3, retrieved from: Archive.org and www.adaytum.co.uk.
Adaytum Software, www.adaytum.co.uk, Mar. 4, 2001 [retrieved Dec. 5, 2005], pp. 1-41, retrieved from: Archive.org and google.com.
"Adaytum Software Announces Industry's First Financial Planning and Modeling Solution", Business Wire, Nov. 9, 1998 [retrieved Dec. 5, 2005], pp. 1-9, retrieved from: Dialog, file 20.
"Delivering Double Decker Bugets at Pizza Hut UK", www.adaytum.co.uk, Jul. 12, 2000 [retrieved Dec. 5, 2005], pp. 1-4, retrieved from Archive.org and adaytum.co.uk.
"Crate and Barrel Drives Expansion and Confidence and Accuracy Using Adaytum E. Planning", www.adaytum.com, Aug. 19, 2000 [retrieved Dec. 5, 2005], pp. 1-2, retrieved from: Archive.org and adaytum.com.
"Checking on Profitability", www.adaytum.co.uk, Jul. 9, 2000 [retrieved Dec. 5, 2005], pp. 1-4, retrieved from: archive.org and www.adaytum.co.uk.
"Flexible Planning at Birmingham Midshires", www.adaytum.co.uk, May 21, 2000 [retrieved Dec. 5, 2005], pp. 1-3, retrieved from: Archive.org and www.adaytum.com.uk.
Chinese Office Action from corresponding Chinese Application Serial No. 200480004734.1 dated Feb. 1, 2008 (13 pages).
Chinese Office Action from corresponding Chinese Application No. 200480004734.1 dated Oct. 10, 2008. (11 pages).
List of References Cited from Japanese Examiner in Office Action from corresponding Japanese Application No. 2006-503377 dated Aug. 31, 2009 (1 page).
Notice of Reasons for Rejection from corresponding Japanese Application No. 2006-503377 dated Aug. 31, 2009 (1 page).
Japanese Office Action from corresponding Japanese Application No. 2006-503377 dated Aug. 31, 2009 (11 pages).

* cited by examiner

HORIZONTAL ENTERPRISE PLANNING IN ACCORDANCE WITH AN ENTERPRISE PLANNING MODEL

TECHNICAL FIELD

The invention relates to computer-implemented techniques for enterprise business planning.

BACKGROUND

Many enterprises are responsible for establishing accurate forecasts for enterprise operations. Failing to meet established expectations can have significant negative impact on the enterprise in the areas of cash flow, stock price, liquidity, and investor faith, among other areas. Examples of enterprise planning activities for which accuracy is critical include revenue forecasting, expense planning, salary planning and the like. Enterprise business planning, however, is a difficult and expensive task that often produces inaccurate results.

Conventionally, enterprises have taken either a "top-down" or a "bottom-up" approach to enterprise planning. Bottom-up planning involves the aggregation of low-level forecasts from the lowest cost centers of an organization. For budget planning, for example, management personnel may be required to periodically forecast expenses, and allocate the expenses to a number of categories, such as advertisement, travel, and salaries. However, the bottom-up forecasts rarely, if ever, reconcile with top-down business targets.

In top-down planning, enterprises identify fundamental business targets, such as average product price, cost per employee, and the like, and push the targets down through the hierarchical structure of the enterprise. However, in performing top-down planning, large, diverse enterprises may develop planning models that do not fit the needs of all the business units or planning goals of the enterprise. In fact, diverse enterprises may develop multiple planning models, e.g., separate models for salary planning, revenue planning, expense planning and the like. The multiple planning models may be created by different individuals, sent out separately, and have separate reconciliation paths.

SUMMARY

In general, the invention is directed to an enterprise planning process that incorporates horizontal planning techniques in addition to vertical planning techniques in order to improve the accuracy and predictability of business planning within enterprises. More specifically, subsets of enterprise analysts utilize horizontal planning techniques to define an enterprise-wide planning model that incorporates a plurality of enterprise planning activities. These horizontal planning techniques allow large, diverse organizations to establish planning standards for multiple planning activities across dozens or hundreds of business units with a single enterprise planning model.

As described in detail herein, a single enterprise planning model may be defined to represent an enterprise, and may include a plurality of hierarchically arranged nodes. Each node represents a cost center such as a business unit, a division or a department of the enterprise. Subsets of enterprise analysts may be associated with respective common nodes of the enterprise hierarchy, and may interact with an enterprise planning system to jointly plan multiple planning activities for the respective nodes. Analysts associated with a common node may, for example, each provide model data that defines a sub-model for a respective planning activity. In this manner, the model creation process can be viewed as joint planning process that traverses horizontally across the node, until the subset of analysts associated with the node finalize a multi-activity enterprise planning model for the node. In particular, the analysts may define sub-models for respective planning activities concurrently.

The enterprise planning system automatically combines the sub-models defined by the subset of analysts into an enterprise-wide planning model for the node. The enterprise planning system may, for example, aggregate the sub-models into a common repository that is accessible enterprise-wide. While combining the sub-models of defined by the subset of analysts, the enterprise planning system may constrain the model data input by the subsets of analysts by the model data of the other analysts associated with the common node.

The enterprise planning system may further interact with subsets of enterprise user associated with nodes of a lower level of the enterprise hierarchy in order to further define the sub-models defined by subsets of analysts associated with higher level nodes. In this manner, the enterprise planning system integrates both vertical planning and horizontal planning. The enterprise planning system may constrain the model data input by the subsets of analysts associated with nodes of lower levels by model data input by subsets of analysts associated with higher level nodes. For example, corporate targets defined by subsets of analysts associated with lower levels of the hierarchy may not exceed corporate targets defined by subsets of analysts associated with higher levels of the hierarchy.

The enterprise planning system executes a contribution phase and a reconciliation phase in accordance with the defined enterprise planning model. During the contribution and reconciliation phases, enterprise planning system receives contribution data from enterprise contributors and may compare the contribution data to respective corporate targets to determine whether the contribution data complies with the targets. The enterprise planning system may, for example, compare contribution data associated with salary planning with salary targets and compare contribution data associated with revenue planning with revenue targets.

When the contribution data does not comply with the target data, e.g., contribution data exceeds the targets, the enterprise planning system selects an enterprise user to review the data and determine whether or not to accept the data. The enterprise user selected to review the contribution data may be based on the target data that is exceeded. For example, if the contribution data exceeds a salary target the enterprise planning system may select an enterprise user associated with salary planning. On the other hand, if the contribution data exceeds an expense target the enterprise planning system may select an enterprise user associated with expense planning.

In one embodiment, the invention provides a method comprising receiving model data from a subset of enterprise users associated with a multi-level enterprise hierarchy, wherein the model data from each of the enterprise users defines a sub-model for a planning activity. The method further comprises combining the sub-models defined by each of the enterprise users to obtain an enterprise planning model that incorporates a plurality of planning activities. The method also includes executing an enterprise planning session in accordance with the defined enterprise planning model.

In another embodiment, the invention provides a system comprising an analysis module to interact with a subset of enterprise users to obtain data that defines an enterprise planning model, wherein the model data received from each of the enterprise users of the subset defines a sub-model for a planning activity and the analysis module combines the sub-models defined by each of the enterprise users to obtain the enterprise planning model. The system further includes a database to store the data that defines the enterprise planning model. The system executes an enterprise planning session in accordance with the data stored in the database that defines an enterprise planning model.

In another embodiment, the invention provides a computer implemented method comprising presenting an interface to receive model data from a subset of enterprise users associated with a multi-level enterprise hierarchy, wherein the model data from each of the enterprise users defines a sub-model for a planning activity. The method further includes processing the sub-models received from each of the enterprise users to obtain an enterprise planning model that incorporates a plurality of enterprise planning activities. The method also includes executing an enterprise planning session in accordance with the defined enterprise planning model via a computer network.

The invention may offer one or more advantages. For example, the techniques described herein may allow more flexibility in defining an enterprise planning model. For example, a large, diverse enterprise may establish planning standards for multiple planning activities across dozens or hundreds of business units. Further, the techniques may allow the analysts defining to the enterprise planning model to concurrently define the multiple planning activities. In this manner, the model data input by each of the analysts is not constrained by the model data of the other analysts associated with the same node. Also, the analysts may each assign enterprise users that may be much more familiar with the forecasting methods implemented by the various enterprise planning activities to lower level nodes.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
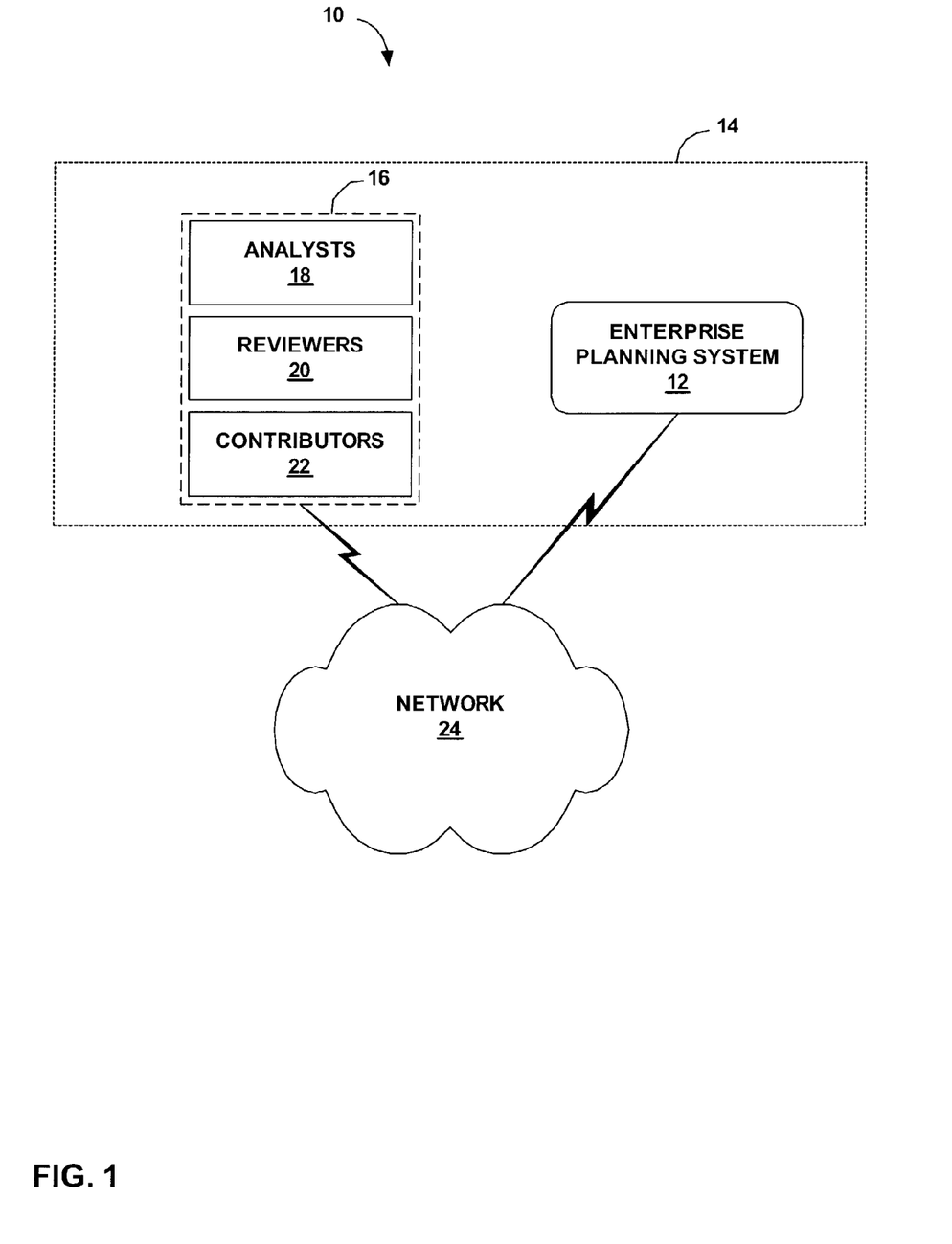
FIG. 1 is a block diagram illustrating a computing environment in which an enterprise planning system utilizes horizontal enterprise planning techniques in accordance with the invention.

FIG. 1 is a block diagram illustrating a computing environment 10 in which an enterprise planning system 12 utilizes horizontal enterprise planning techniques in accordance with the invention. As will be described, enterprise planning system 12 may be configured to enable subsets of enterprise users 16, and more particularly, subsets of analysts 18 to define portions of an enterprise planning model, e.g., planning sub-models, for respective enterprise planning activities. Enterprise planning system 12 automatically combines the sub-models defined by the subsets of analysts 18 to obtain a universal enterprise planning model. In general, the term "universal" enterprise planning model refers to an enterprise-wide planning model that incorporates sub-models for a plurality of enterprise planning activities, each of which may be separately planned. The enterprise planning activities may be forecasts for enterprise operations and may include, for example, salary planning, expense planning, revenue planning and the like.

Enterprise planning system 12 executes an enterprise planning session that includes three phases of enterprise planning: (1) a modeling phase, (2) a contribution phase, and (3) a reconciliation phase. In the modeling phase, analysts 18 define a universal enterprise planning model in accordance with vertical as well as horizontal enterprise planning techniques as described. In other words, the modeling phase flows from cost centers at a top level of an enterprise to cost centers at a bottom level as well as across each of the cost centers to develop a complete enterprise-wide model. The enterprise planning model defined by the subsets of analysts 18 includes, for example, a planning hierarchy for enterprise 14, corporate targets for cost centers within enterprise 14, templates for collecting forecast data and the like.

The enterprise hierarchy includes a number of hierarchically arranged nodes. Each node represents a cost center within enterprise 14, such as a business unit, a division or a department. The hierarchically arranged nodes may further be divided into sub-nodes that represent respective planning activities of the nodes. As described in detail herein, subsets of analysts 18 may be associated with respective common nodes of the enterprise hierarchy. The analysts 18 associated with common nodes interact with enterprise planning system 12 to jointly plan multiple enterprise activities for the node. Analysts 18 associated with the common node may, for example, each provide model data that defines a portion of the enterprise planning model, e.g., a sub-model, for a respective enterprise planning activity, e.g., sub-node. In this manner, the model creation process can be viewed as joint planning process that traverses horizontally across the node, until analysts 18 associated with the node finalize a multi-activity enterprise planning model for the node. Accordingly, the term "horizontal planning" is used to refer to this type of process in which creation of an enterprise planning model flows across a node of an organization. In particular, analysts 18 may define sub-models for respective planning activities concurrently.

In general, analysts 18 establish corporate targets, e.g., salary targets, for enterprise 14 during the modeling phase. More specifically, analysts 18 establish corporate targets for each node of the enterprise hierarchy. In addition, analysts 18 may assign one or more enterprise users 16 to each node that are responsible for the enterprise planning of the cost center associated with the node. Particularly, analysts 18 may assign enterprise users 16 to sub-nodes associated with a particular enterprise planning activities of a node. Enterprise users 16 assigned to the nodes may be designated as analysts 18, reviewers 20, contributors 22, or a combination thereof. Enterprise users 16 may be authorized users within enterprise 14 and may include, for example, chief financial officers, senior financial analysts, product analysts, sales analysts, managers, supervisors, sales representatives, lab managers, human resources managers or the like. Finally, analysts 18 may define a number of templates for collecting contribution data from contributors 22. Analysts 18 may include the corporate target data in the templates to facilitate reconciliation with the contribution data.

In accordance with the invention, the modeling phase of the enterprise planning session occurs horizontally within the nodes or across the levels of the enterprise hierarchy as well as vertically down the levels of the enterprise hierarchy. More particularly, a subset of analysts 18 associated with a common node each defines a sub-model for a respective enterprise planning activity, e.g., sub-node. In other words, enterprise planning system 12 receives model data from the subset of analysts 18 defining a plurality of different planning activities for the common node. In this manner, each subset of analysts 18 associated with a common node of the enterprise hierarchy interact with enterprise planning system 12 to jointly define an enterprise planning model that accounts for a plurality of planning activities such as salary planning, revenue planning, expense planning and the like for the node.

For example, a subset of analysts 18 associated with a highest level node of the enterprise hierarchy may include a chief financial officer and a human resources manager of enterprise 14. The chief financial officer may define a portion of the enterprise planning model, e.g., a first sub-model including corporate targets, templates, and the like, for expense planning while the human resources manager may define a portion of the enterprise planning model, e.g., a second sub-model, for salary planning. Enterprise planning system 12 automatically combines the sub-models defined by the chief financial officer and the human resources manager into a universal enterprise planning model. In the illustrated example, enterprise planning system 12 combines the sub-models for the enterprise planning activities to obtain an enterprise-wide planning model that incorporates salary planning as well as expense planning. In this manner, a multi-activity enterprise planning model for the node is defined across the node using horizontal planning techniques.

As described, the enterprise planning process further occurs vertically down the levels of the enterprise hierarchy. More particularly, enterprise planning system 12 receives model data further defining an enterprise planning model from subsets of analysts 18 associated with lower level nodes. The subsets of analysts 18 may be constrained by the model data input by subsets of analysts 18 associated with higher level nodes.

Once the planning model has been defined, enterprise planning system 12 executes the remaining phases of the enterprise planning session, i.e., the contribution phase and the reconciliation phase, in accordance with the defined enterprise planning model. More specifically, upon completion of the modeling phase, enterprise planning system 12 enters the contribution phase during which contributors 22 interact with enterprise planning system 12 and input detailed forecasts in the form of contribution data using the defined templates. For example, contributors 22 may provide detailed forecasts for a particular planning activity of the node to which the contributor is assigned. Alternatively, contributor 22 may provide detailed forecasts for the entire node, i.e., forecasts for each enterprise planning activity. The forecasts may include planning activity forecasts such as financial forecasts, revenue forecasts, order forecasts, inventory forecasts, estimated resource requirements, salary forecasts and the like, depending on the particular enterprise planning activities being carried out by enterprise 14.

During the reconciliation phase, enterprise planning system 12 automates the reconciliation of the contribution data with the corporate target data provided by analysts 18. In particular, enterprise planning system 12 operates in accordance with the defined universal enterprise planning model and, more particularly, in accordance with the planning hierarchy to provide a hierarchical planning process having multiple reconciliation levels. As each of contributors 22 provides respective contribution data, enterprise planning system 12 automatically aggregates the contribution data and compares the aggregated data with respective target data in real-time to determine whether the aggregated data complies with the target data. As will be described, enterprise planning system 12 may aggregate the contribution data across each cost center as well as across enterprise 14 in real-time and compare the aggregated data with respective targets. In this manner, the reconciliation phase occurs horizontally as well as vertically in accordance with the planning hierarchy.

When the contribution data is within the corporate targets defined by analysts 18, enterprise planning system 12 proceeds to the next reconciliation level. However, when the contribution data exceeds the target data defined by analysts 18, enterprise planning system 12 provides reviewers 20 associated with higher level nodes of the enterprise hierarchy with access to the aggregated data. Reviewers 20 view the aggregated data across enterprise 14 in real-time during the enterprise planning session. At each level, enterprise planning system 12 ensures that reviewers 20, as defined by the nodes of the enterprise hierarchy, reconcile the target data with the contribution data when the contribution data input by contributors 22 exceeds the respective target data. Reviewers 20 may, for example, be responsible for reviewing contribution data for a single enterprise planning activity associated with a node. Alternatively, a single reviewer 20 may review contribution data for all of the planning activities associated with the node. Each reviewer 20 may, for example, reject or accept the contribution data in view of the aggregated data and target data.

The contribution and reconciliation phases continue until the contribution data is ultimately approved either automatically by enterprise planning system 12 or by enterprise user 16 associated with the highest-level node of the enterprise hierarchy. In this manner, enterprise planning system 12 ensures that the contribution data from contributors 22 reconciles both horizontally and vertically with corporate target data provided by analysts 18.

Enterprise users 16 may interact with enterprise planning system 12 via a network 24. Enterprise users 16 may directly access enterprise planning system 12 via a local area network, or may remotely access enterprise planning system 12 via a virtual private network, remote dial-up, or similar remote access communication mechanism. Network 24 represents any communication network, such as a packet-based digital network like the Internet. Further network 24 may be a local area network (LAN), a wide area network (WAN), a wireless local area network (WLAN), or the like. In this manner, system 10 can readily scale to suit large enterprises. Enterprise users 16 may use a variety of computing devices to interact with enterprise planning system 12 via network 24. For example, enterprise users 16 may interact with enterprise planning system 12 using a laptop computer, desktop computer, or the like. Alternatively, enterprise users 16 may use a personal digital assistant (PDA), a web-enabled cellular phone, or similar device.

Figure 2:
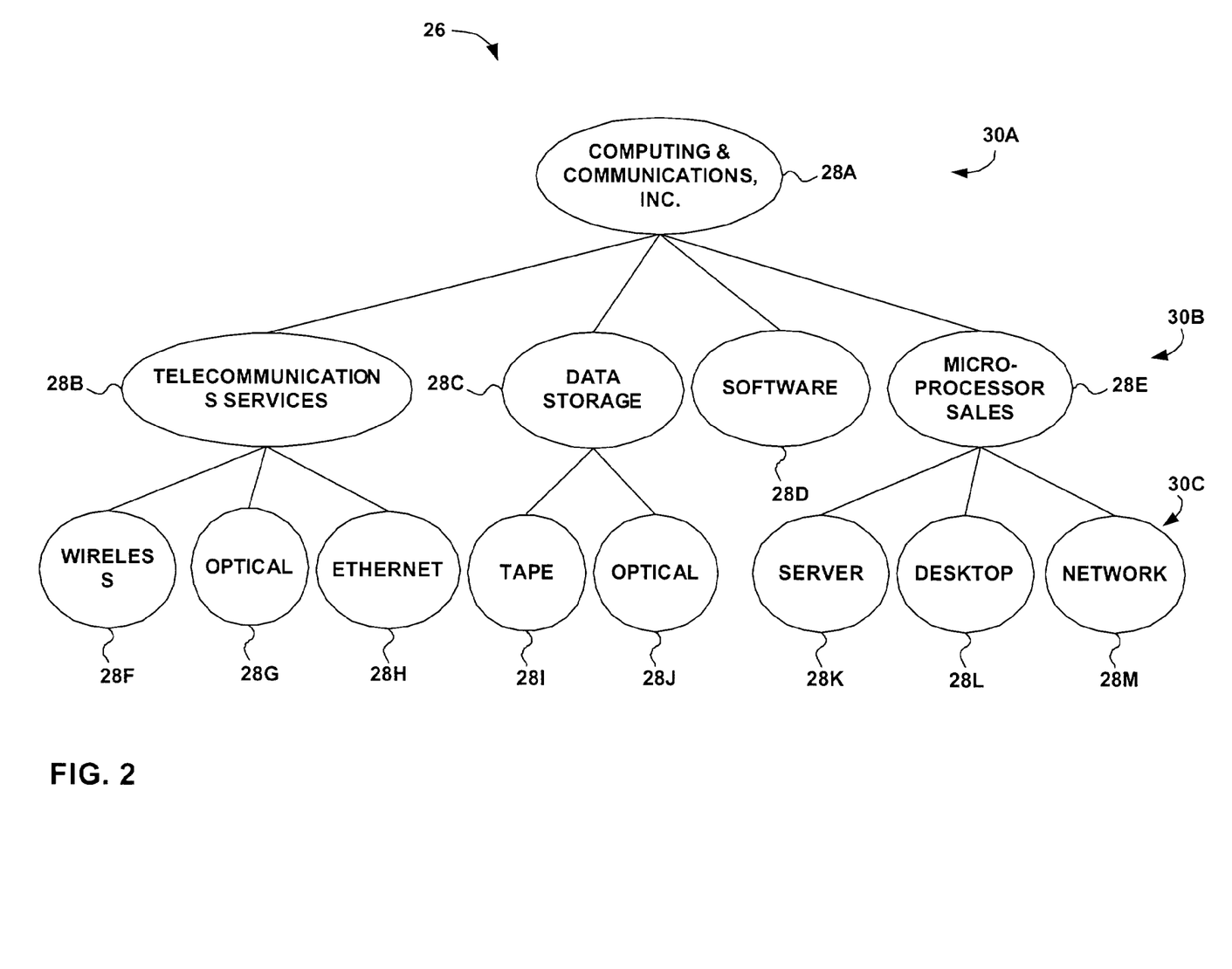
FIG. 2 is a diagram illustrating an example enterprise hierarchy of an enterprise used to create an enterprise planning model using horizontal planning techniques in addition to vertical planning techniques.

FIG. 2 is a diagram illustrating an example enterprise hierarchy 26 of an enterprise 14 used to create an enterprise planning model using horizontal planning techniques in addition to vertical planning techniques. A set of analysts 18 interact with enterprise planning system 12 to concurrently define an enterprise planning model that incorporates a plurality of planning activities, as described above. Subsets of analysts 18 may, for example, each define portions of the enterprise planning model, e.g., sub-models for various planning activities, which enterprise planning system 12 automatically combines to create a universal enterprise planning model.

Enterprise hierarchy 26 includes nodes 28A-28M ("nodes 28") vertically organized into reconciliation levels 30A-30C ("reconciliation levels 30"). In the example of FIG. 2, nodes 28 of enterprise hierarchy 26 are vertically organized into three reconciliation levels 30. However, nodes 28 of enterprise hierarchy 26 may be vertically organized to have any number of reconciliation levels 30. As will be described, reconciliation may further occur across each of nodes 28, e.g., between planning activities of nodes 28.

Enterprise hierarchy 26 may further be organized horizontally based on various attributes of enterprise 14. For example, enterprise hierarchy 26 may be horizontally organized based on various geographic regions occupied by enterprise 14, various business units, divisions or departments within enterprise 14, or the like. Further, enterprise hierarchy 26 may be horizontally organized based on a combination of enterprise attributes. In the example of FIG. 2, reconciliation level 30B of enterprise hierarchy 26 is horizontally organized based on divisions within enterprise 14 while reconciliation level 30C is organized based on departments within each division of enterprise 14.

More particularly, enterprise 14 of FIG. 2 is a fictitious computer and communications company (Computer & Communications, Inc.) that has divisions in operation throughout the country or world. Reconciliation level 30B may be horizontally organized based on the divisions. For example, nodes 28B-28E may correspond to a telecommunications services division, a data storage division, a software division, and a microprocessor sales division, respectively. Reconciliation level 30C may be horizontally organized based on baseline departments within each of the divisions. The telecommunications services division, for example, includes three associated departments; a wireless telecommunication department, an optical telecommunications department, and an Ethernet telecommunications department represented by nodes 28F-28H, respectively. The data storage division includes a tape storage department and an optical storage department represented by nodes 28I and 28J, respectively. Further, the microprocessor sales division includes a general purpose processor department, embedded processor department, and a network processor department represented by nodes 28K-28M, respectively.

The set of analysts 18 define the enterprise planning model vertically in accordance with enterprise hierarchy 26. As described above, the set of analysts 18 further define the enterprise planning model horizontally across each of nodes 28 and, more particularly across the planning activities of each of nodes 28. In this manner, the modeling process flows from a top level of enterprise hierarchy 26, e.g., level 30A, to a bottom level, e.g., level 30C, as well as across planning activities of each of nodes 28 to develop a complete enterprise-wide model. As will be described, each of nodes 28 may further be divided into sub-nodes (not shown) that correspond to planning activities to aid in horizontal planning across nodes 28. More particularly, subsets of analysts 18 may define sub-models for respective sub-nodes and enterprise planning system 12 may automatically combine the sub-models of the sub-nodes to develop a planning model for the associated node.

In the example illustrated in FIG. 2, a subset of analysts 18 associated with node 28A may horizontally define an enterprise planning model for node 28A across multiple planning activities. In other words, the subset of analysts 18 associated with node 28A may define sub-models for respective planning activities. Analysts 18 may, for example, consist of a chief financial officer that defines a sub-model for expense planning and a human resources manager that defines a sub-model for salary planning. In this manner, the subset of analysts 18 defines an enterprise planning model that concurrently executes both expense planning and salary planning. Although the example of horizontal planning across planning activities of node 28A is described with only two analysts 18 defining the enterprise planning model for node 28A, any number of analysts 18 may horizontally define the enterprise planning model across node 28A. Further, the enterprise planning model may incorporate any number of sub-models for planning activities, with at least one analyst 18 associated with each planning activity.

As described, each of analysts 18 may define respective sub-models that correspond to particular planning activities or sub-nodes. The sub-models may include corporate target data and templates for collecting contribution data for the respective planning activities. Analysts 18 may define a number of templates, which may include templates for collecting forecast data for each of the planning activities. The templates may, for example, include at least one template for collecting expense forecast data and at least one template for collecting salary forecast data. The templates may include the established corporate target data to facilitate reconciliation with the contribution data input by contributors 22. Enterprise planning system 12 may associate one or more of the templates with enterprise users designated as contributors 22. More specifically, enterprise planning system 12 may associate a different subset of the templates to contributors 22 based on the sub-node or planning activity to which each contributor 22 is assigned. For example, enterprise planning system 12 may associate a subset of the templates for collecting salary data to contributors 22 assigned to the salary planning sub-node and a subset of templates for collecting expense data to contributors 22 assigned to the expense planning sub-node.

The sub-models may further include enterprise users 16 associated with lower level nodes that are responsible for planning of respective planning activities of the sub-node to which enterprise users 16 are assigned. Each of analysts 18 associated with node 28A may assign at least one enterprise user 16 to each of nodes 28B-28E and, more particularly to a planning activity associated with each of nodes 28B-28E, i.e., a sub-node, in order to associate an enterprise user 16 to the node that is familiar with one or more of the various planning activities. For example, the chief financial officer may assign an enterprise user 16 familiar with expense planning to an expense planning sub-node and the human resources manager may assign an enterprise user 16 familiar with salary planning to a salary planning sub-node. In this manner, enterprise users 16 assigned to the sub-nodes of node 28B may only participate in the planning sub-model to which the enterprise users are assigned. In some embodiments, however, a single enterprise user 16 may be assigned to the node to be responsible for all the planning activities of the node.

Analysts 18 may further designate each of the enterprise users 16 as an analyst 18, a reviewer 20, a contributor 22, or a combination thereof. Enterprise users designated as analysts 18 may extend one or more of the sub-models to personalize the enterprise planning model to lower level nodes 28 as will be described. However, analysts 18 associated with lower level nodes may be constrained by the model data input by analysts 18 associated with higher level nodes. For example, an analyst 18 associated with node 28B may not define corporate targets that exceed the targets assigned to node 28B by analysts 18 associated with node 28A. Further, analysts 18 associated with lower level nodes may further be constrained by model data input by other analysts 18 associated with the same node or nodes on the same level of enterprise hierarchy 26. For example, an analyst 18 associated with node 28A may assign a single overall growth target to node 28B and analysts 18 associated with node 28B may distribute the overall growth target between a salary growth target and an expense growth target. Analyst 18 associated with the salary planning sub-node is constrained by analyst 18 associated with the expense planning sub-node and vice versa. In this manner, analysts 18 associated with each node 28 of enterprise hierarchy 16 are constrained not only by vertical constraints, but also by horizontal constraints.

Enterprise users designated as contributors 22 provide contribution data to enterprise planning system 12 and enterprise users designated as reviewers 20 accept or reject contribution data provided by contributors 22. As with analysts 18 assigned to each node of enterprise hierarchy 26, contributors 22 and reviewers 20 may only provide contribution data and review data to enterprise planning system 12 for sub-nodes to which they are assigned. In other words, contributors 22 and reviewers 20 may only provide contribution data and review data to enterprise planning system 12 for respective planning activity sub-models.

Enterprise planning system 12 automatically combines the sub-models for each of the planning activities into a universal enterprise planning model. More specifically, enterprise planning system 12 automatically aggregates all of the sub-models into a common repository that may be accessed enterprise-wide. In this manner, enterprise planning system 12 maintains all of the necessary planning data and templates in a centralized location that may be accessed by each of nodes 28. For example, node 28J may access all of the templates associated with node 28J in the centralized location.

Once the model has been defined, enterprise planning system 12 executes the remaining phases of the enterprise planning session in accordance with the enterprise planning model. More specifically, enterprise planning system 12 initiates the process of receiving contribution data from the lowest reconciliation level of enterprise hierarchy 26, e.g., nodes 28F-28M of reconciliation level 30C in the example of FIG. 2. In some embodiments, the lowest reconciliation level for one or more of the sub-models may be different. For example, the lowest reconciliation level for a sub-model for expense planning may be reconciliation level 30C while the lowest reconciliation level for a sub-model for salary planning may be reconciliation level 30B. However, regardless of whether each of the sub-plans corresponds to a common lowest reconciliation level, enterprise planning system 12 executes the enterprise planning session in accordance with a single reconciliation scheme.

Contributors 22 corresponding to the lowest level nodes are, for example, notified to complete the defined templates, which may be accessed via enterprise planning system 12. As described above, each of contributors 22 of nodes 28 is associated with one or more corresponding templates, depending upon the sub-node or planning activity to which the contributor is assigned. Contributors 22 provide contribution data to enterprise planning system 12 via the associated templates.

When contributors 22 submit the contribution data, enterprise planning system 12 aggregates the contribution data and compares the aggregated data to respective target data defined by the set of analysts 18. More specifically, enterprise planning system 12 may aggregate and compare data within the sub-models. In the example illustrated, aggregated data associated with salary planning, e.g., collected via a salary planning template, may be compared with the salary targets of the sub-model for salary planning and aggregated data associated with expense planning may be compared with the expense targets of the sub-model for expense planning. In this manner, enterprise planning system 12 performs vertical reconciliation of the sub-models separately.

Enterprise planning system 12 may further perform horizontal reconciliation. Enterprise planning system 12 may, for example, perform reconciliation across each of nodes 28 or across a set of nodes 28 corresponding to a reconciliation level 30. For instance, enterprise planning system 12 may combine the contribution data input for each sub-node, and compare the aggregated contribution data to aggregated corporate targets for the nodes 28. In the illustrated example, node 28B may combine the contribution data input to a template associated with the sub-node for salary planning and the contribution data input to a template associated with the sub-node for expense planning. Enterprise planning system 12 then compares the aggregated data to an aggregated target. The aggregated target may, for example, include the sum of the expense target and the salary target. In this manner, enterprise planning system 12 compares the enterprise forecasts of a node as a whole instead of enterprise forecasts for each sub-model of the node.

When the aggregated data complies with the respective target data, e.g., is within a target range or below a target threshold, enterprise planning system 12 automatically approves the contribution data and proceeds to the next reconciliation level. Automatic approval greatly reduces the number of manual reviews and approvals that need to be performed. However, when the aggregated data exceeds the target data, enterprise planning system 12 selects a reviewer 20 associated with a corresponding node 28 of the next reconciliation level, i.e., reconciliation level 30B. As described above, enterprise planning system 12 may select a reviewer 20 based on which target the contribution data exceeds. For example, if the contribution data exceeds the salary target, enterprise planning system 12 may select a reviewer 20 assigned to the sub-node associated with salary planning. In this manner, the reconciliation route followed by enterprise planning system 12 depends on the contribution data input by contributors 22. In some embodiments, however, the reconciliation process may be performed entirely by manual reviews by reviewers 20.

Reviewers 20 either accept or reject the contribution data based on the defined corporate targets. Contribution data that is rejected is sent back to associated contributors 22. Contributors 22 may revise the contribution data and resubmit the templates. The reconciliation process continues until enterprise planning system 12 has "automatically" accepted all of the contribution data or an enterprise user 16 associated with the highest level node, i.e., node 28A, has accepted all of the contribution data.

Figure 3:
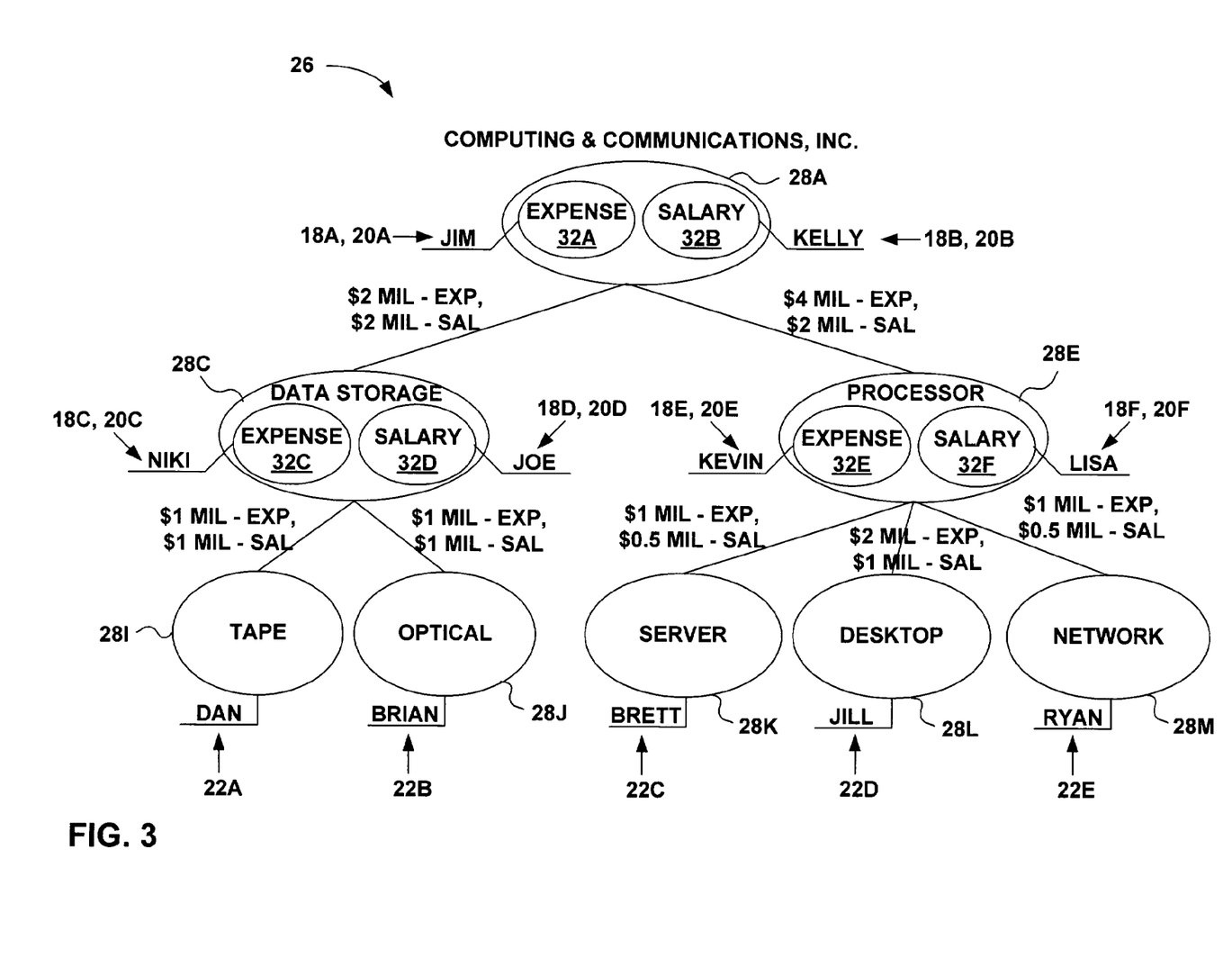
FIG. 3 is a diagram providing an example of an enterprise planning process that incorporates horizontal planning and reconciliation techniques.

FIG. 3 is a diagram providing an example of an enterprise planning process that incorporates horizontal planning and reconciliation techniques. In particular, FIG. 3 illustrates a portion of the planning process carried out in accordance with enterprise hierarchy 26 (FIG. 2). The portion of enterprise hierarchy 26 illustrated in FIG. 3 includes sub-nodes 32A-32F ("sub-nodes 32") that correspond to particular planning activities within respective nodes 28. In this example, analysts 18A-18F ("analysts 18") jointly define a universal enterprise planning model using horizontal planning techniques in addition to vertical planning techniques. Nevertheless, the universal modeling phase may be defined by any number of analysts 18.

In the example illustrated in FIG. 3, an enterprise planning model for node 28A is defined by analysts 18A and 18B using horizontal planning within node 28A. More particularly, analyst 18A, i.e., Jim from finance defines a first sub-model and analyst 18B, i.e., Kelly from human resources defines a second sub-model. In the example of FIG. 3, Jim defines a sub-model for expense planning for Computing & Communications, Inc. and Kelly defines a sub-model for salary planning for Computing & Communications Inc. In this manner, Jim and Kelly may correspond with sub-nodes 32A and 32B, respectively.

Jim and Kelly may define sub-models that include corporate targets for lower level nodes, templates for collecting contribution data, and enterprise users assigned to lower level nodes. Analysts 18A and 18B, i.e., Jim and Kelly, may define sub-models for divisions of Computing & Communications Inc., divisions and departments of Computing & Communications Inc., or only a portion of the divisions and departments of Computing & Communications Inc.

For example, Jim may define an annualized expense growth target of six million dollars and Kelly may define an annualized salary growth target of four million dollars for Computing & Communications Inc. Jim and Kelly further define the expense and salary growth targets for nodes 28 of reconciliation level 30B, i.e., nodes 28C and 28E in FIG. 3. Jim may, for example, define an expense growth target of four million dollars for the microprocessor sales division, i.e., node 28E, and a two million dollar expense growth target for the data storage division, i.e., node 28C. Jim may further define target expense growths for the departments within the divisions, depending on the size of enterprise 14. For example, for a small enterprise, Jim may further distribute the four million dollar expense growth target for the processor division and the two million dollar expense growth target for the data storage division among the corresponding departments.

Kelly may distribute the four million dollars annualized salary growth target among the divisions and departments in a similar fashion. More particularly, Kelly may define a two million dollar annualized salary growth target for each of the divisions, i.e., nodes 28C and 28E. Further, for a small enterprise, Kelly may distribute the two million dollar annualized salary targets of the divisions among the departments. In this manner, analysts 18 of node 58A define targets for sub-models of enterprise hierarchy 26.

Jim and Kelly may also assign enterprise users to nodes 28 and, more particularly, to sub-nodes 32 to be responsible for planning activities associated with the sub-node. For example, Jim may assign an enterprise user named Niki to sub-node 32C to be responsible for expense planning in the data storage division and an enterprise user named Kevin to sub-node 32E to be responsible for expense planning in the microprocessor sales division. Jim may further designate Niki and Kevin as analysts 18 as well as reviewers 20. In the same manner, Kelly may assign an enterprise user named Joe to sub-node 32D to be responsible for salary planning in the data storage division and an enterprise user named Lisa to sub-node 32F to be responsible for salary planning in the microprocessor sales division. In this manner, each sub-node 32 is associated with enterprise users familiar with the respective planning activities. Jim and Kelly may assign users to nodes 28I, 28J, and 28K-28M, i.e., nodes corresponding to departments of Computer & Communications Inc, in the same manner as described above for the divisions. Alternatively, a single enterprise user may be assigned to a node and be responsible for all the enterprise planning activities of the cost center associated with the node.

In the same manner, analysts 18C-18F associated with nodes 28C and 28E further define planning models horizontally within the respective nodes 28. More particularly, analysts 18C-18E define corporate targets, templates, and enterprise users for lower level nodes, i.e., nodes of reconciliation level 30C. For example, Niki further defines a respective sub-model for sub-node 32C to which Niki is assigned. Niki may, for example, distribute the defined expense targets among the tape storage department and the optical storage department, in turn, extending the sub-model for expense planning. For instance, the optical storage department may be a larger expense producer and therefore get a larger expense target. In that case, Niki may decide to assign the tape storage department a half million dollar expense growth target whereas the optical storage department receives a one and a half million dollar expense growth target. Niki may further define other model data of the sub-model, e.g., assign enterprise users to lower level nodes, define or update templates, and the like. In the same manner, other analysts 18 associated with sub-nodes 32 of reconciliation level 30B may also define respective sub-models for sub-nodes 32 to which analysts 18 are assigned.

Analysts 18 associated with lower level nodes are constrained by the model data defined by analysts 18 associated with higher level nodes. Analysts 18 may further be constrained by model data defined by other analysts 18 associated with sub-nodes within a common node or other analysts 18 associated with a common reconciliation level 30. For example, the growth targets, e.g., salary growth target and expense growth target, assigned by analysts 18 of node 28A may be combined to attain a single growth target. The analysts 18 associated with lower level nodes, e.g., node 28C, may distribute the overall growth target between a salary growth target and an expense growth target. Analyst 18 associated with sub-node 28C, i.e., Niki is constrained by analyst 18 associated with sub-node 28D, i.e., Joe and vice versa. In this manner, analysts 18 associated with each node 28 of enterprise hierarchy 16 are constrained not only by vertical constraints, but also by horizontal constraints.

Figure 4:
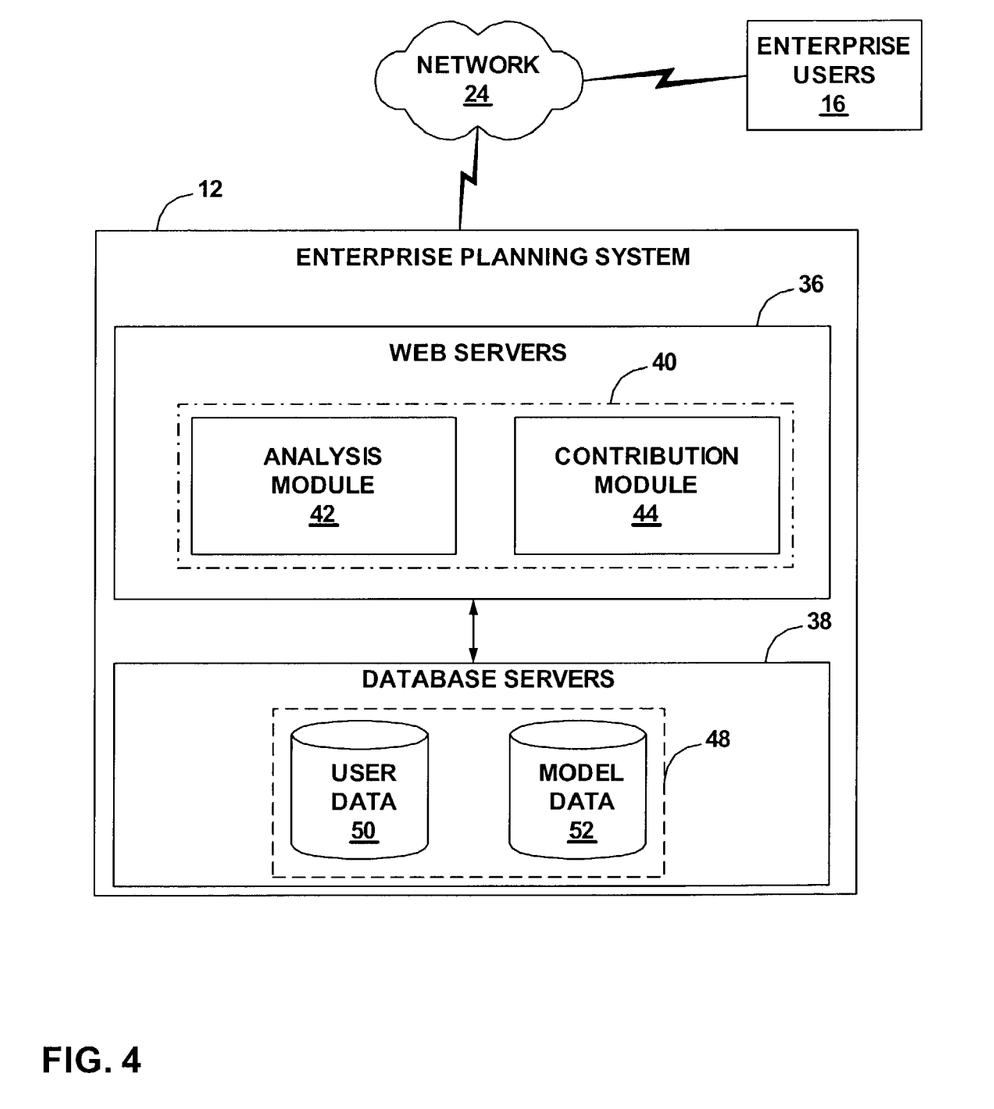
FIG. 4 is a block diagram illustrating an exemplary enterprise planning system that enables a set of analysts to define an enterprise planning model using horizontal planning techniques.

FIG. 4 is a block diagram illustrating an exemplary enterprise planning system 12 that enables a set of analysts 18 to define an enterprise planning model using horizontal planning techniques in addition to vertical planning techniques. In the example illustrated in FIG. 4, enterprise planning system 12 includes web servers 36 and database servers 38. Web servers 36 execute web server software to provide an interface for communicating with enterprise users 16 via network 24. More specifically, web servers 36 provide an environment for interacting with analysts 18, reviewers 20, and contributors 22 according to software modules 40, which include an analysis module 42 and a contribution module 44.

Software modules 40 may comprise Lotus scripts, Java scripts, Java Applets, Active Server Pages, web pages written in hypertext markup language (HTML) or dynamic HTML, Active X objects, and other suitable modules. Web servers 36 serve up web pages defined by software modules 40, and communicate the web pages to computing devices of enterprise users 16. The web pages may include static media, such as text and graphic imagery, as well as conventional input media such as text entry boxes, radio buttons, drop-down menus, and the like, for receiving information from enterprise users 16.

Software modules 40 interact with database servers 38 to access enterprise data 48, which includes user data 50 and model data 52. Enterprise data 48 may be stored in a number of different forms including one or more data storage files, or one or more database management systems (DBMS) executing on one or more database servers. The database management systems may be a relational (RDBMS), hierarchical (HDBMS), multidimensional (MDBMS), object oriented (ODBMS or OODBMS) or object relational (ORDBMS) database management system. Furthermore, although illustrated separately, enterprise data 48 could be combined into a single database or other data storage structure. User data 50 and model data 52 could, for example, be implemented as a single relational database.

User data 50 stores information for each of enterprise users 16, including a name, an electronic mail (email) address, and other contact information. Model data 52 stores enterprise planning models defined by a set of analysts 18. Model data 52 may include, for example, information that defines a reconciliation process developed by analysts 18, including a number of reconciliation levels, various nodes in an enterprise hierarchy, and enterprise users 16 associated with the nodes. In addition, model data 52 stores respective data entry templates for capturing contribution and review data from enterprise users 16.

Analysis module 42 includes one or more software modules for defining an enterprise planning model that control the entire planning process both vertically and horizontally. Analysis module 42 may, for example, allow a subset of analysts 18 associated with a common node to further define model data input by enterprise users associated with higher level nodes. Analysis module 42 also allows the subset of analysts 18 associated with the common node to horizontally define sub-models across planning activities associated with the common node. In this manner, analysis module 42 allows the subset of analysts 18 to define a multi-activity enterprise model for the respective common node using both horizontal and vertical planning techniques. The model data input to enterprise planning system 12 via analysis module 42 includes corporate target data, templates for collecting contribution data, enterprise users 16 assigned to lower level nodes and the like.

More specifically, analysis module 42 presents an interface to each of the analysts 18 of the common node to receive model data that defines a sub-model for a respective planning activity. The interfaces may be presented to the subset of analysts concurrently, such that each analyst 18 defines the sub-models simultaneously. In this manner, the sub-models being defined by each of the analysts 18 are not constrained by the model data input by other analysts 18 associated with the same node. In some embodiments, however, the interfaces may be presented to the subset of analysts concurrently, but the analysts input in constrained by the input of other analysts associated with the same node.

Analysis module 42 automatically combines the model data defining the sub-models for the various planning activities to create a universal enterprise planning model for the node. More specifically, enterprise planning system 12 automatically aggregates all of the sub-models into a common repository that may be accessed enterprise-wide. In this manner, enterprise planning system 12 maintains all of the necessary model data in a centralized location that may be accessed by each of nodes 28.

Analysis module 42 also allows analysts 18 to define a number of mechanisms for automating the planning process and ensuring that the contributors 22 submit their respective contribution data timely, and that templates quickly move through the defined reconciliation stages. For example, using analysis module 42, analysts 18 can define timers for triggering email messages to remind the contributors 22 to access enterprise planning system 12 and complete a particular template. Further, analysts 18 may define timers for triggering indications to remind other analysts 18 of the subset associated with the node to define a respective portion of model data 52.

Contribution module 44 includes software modules for presenting the templates to enterprise users 16 designated as contributors 22, and for capturing contribution data from contributors 22. Contribution module 44 may, for example, access model data 52 and present a template associated with contributor 22. Contribution module 44 automatically aggregates the contribution data in real-time, and compares the aggregated data to respective corporate targets defined by analysts 18. Contribution module 44 may, for example, compare the aggregated data associated with salary planning, i.e., collected via salary planning templates, with the salary targets of the sub-model for salary planning and compare the aggregated data associated with expense planning with the expense targets of the sub-model for expense planning. In this manner, enterprise planning system 12 performs vertical reconciliation of the sub-models separately.

Contribution module 44 may further perform horizontal reconciliation across each of the nodes of the enterprise hierarchy. For instance, contribution module 44 may combine the contribution data input for each planning activity, and compare the aggregated contribution data to aggregated corporate targets for the nodes. Contribution module 44 also provides access to the aggregated data to reviewers 20 associated with higher levels of enterprise 14 when the aggregated data exceeds the corporate targets.

Figure 5:
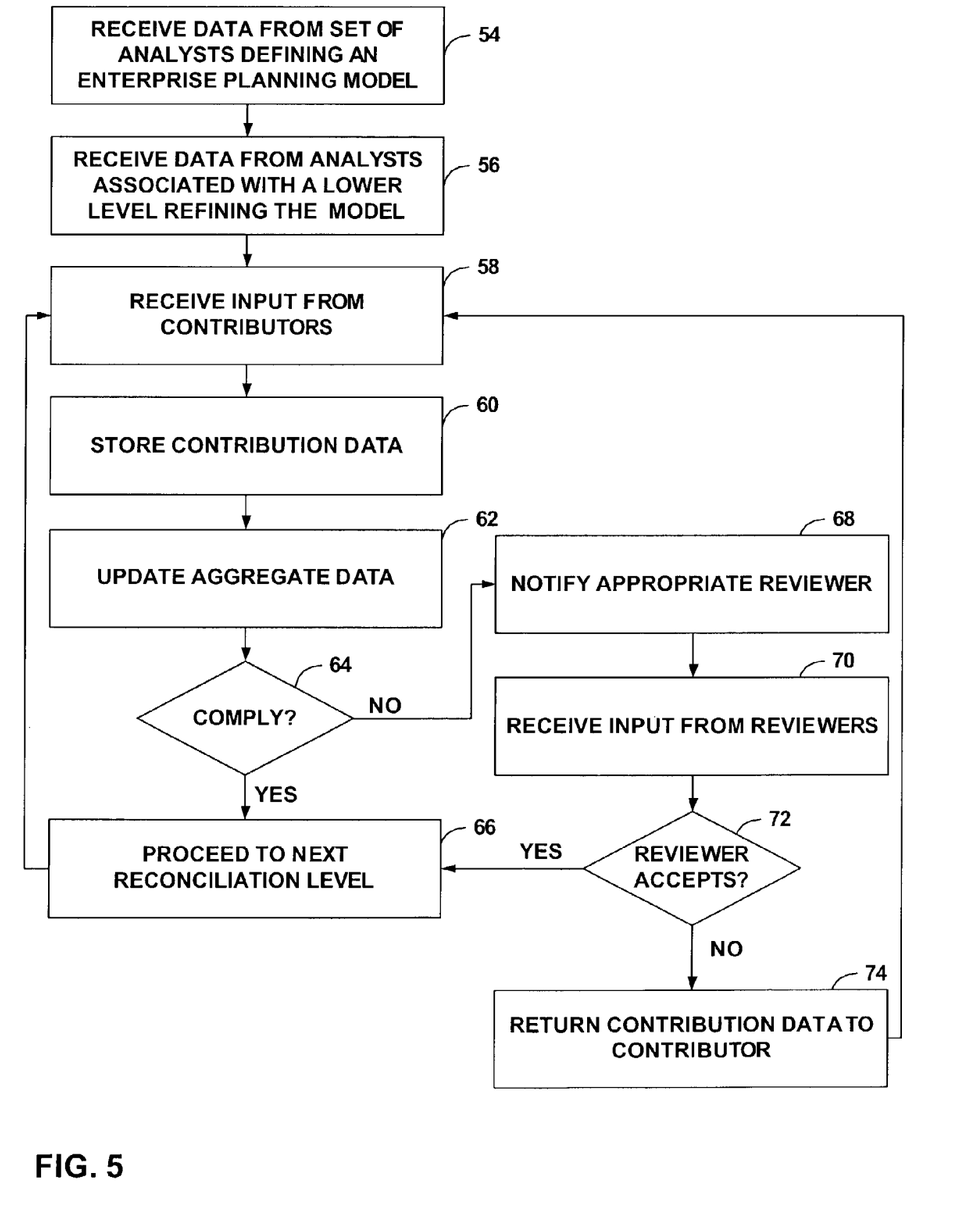
FIG. 5 is a flowchart illustrating an exemplary mode of operation of an enterprise planning system.

FIG. 5 is a flow diagram illustrating an exemplary mode of operation of enterprise planning system 12. Initially, enterprise planning system 12 receives data defining an enterprise planning model from a subset of analysts 18 associated with a common node (54). The common node with which the subset of analysts is associated is initially a highest level node of an enterprise hierarchy. The set of analysts 18 interact with enterprise planning system 12 to develop an enterprise planning model that incorporates multiple planning activities such as expense planning, revenue planning, salary planning and the like. For example, a first analyst 18 of the subset may define a sub-model for revenue planning and a second analyst 18 of the subset may define a sub-model for salary planning. In this manner, a multi-activity enterprise planning model for the node is defined horizontally across the node of the enterprise hierarchy.

Enterprise planning system may optionally receive data from one or more analysts 18 associated with lower level nodes of the enterprise hierarchy (56). The data received from the analysts associated with the lower level nodes may further define the enterprise planning model initially defined by analysts 18 associated with the highest level node. More particularly, the data received from the analysts associated with the lower level nodes may further define the sub-models for the planning activities. For example, the analyst associated with the lower level node may distribute the target data assigned to the associated node among downstream nodes. In this manner, the analyst 18 associated with the lower level node is constrained by the targets defined by analysts 18 of higher level nodes.

Enterprise planning system 12 receives forecast data from contributors 22 (58). Enterprise planning system 12 may, for example, receive a request from one of contributors 22 to access enterprise planning system 12. Enterprise planning system 12 may access enterprise data 38 and communicate one or more associated input templates to contributor 22 in response to the request. If contributor 22 has previously input contribution data, enterprise planning system 12 identifies and retrieves any contribution data previously stored by contributor 22. Contributors 22 may input new contribution data or update contribution data previously stored in the associated templates.

Upon receiving new or updated contribution data from contributors 22, enterprise planning system stores the contribution data in model data 42 (60). Enterprise planning system 12 further identifies higher level nodes that are affected by the new or updated contribution data and automatically updates respective aggregate totals in real-time for each of the identified higher level nodes (62). For instance, using enterprise hierarchy 26 of FIG. 2 as an example, when enterprise planning system 12 receives new or updated contribution data from contributor 22 of node 28G, enterprise planning system 12 identifies higher level nodes 28A and 28B as nodes that are affected by the new or updated contribution data and automatically updates the aggregate totals for nodes 28A and 28B. In this manner, the aggregate totals are readily available for reviewers 20 across enterprise 14.

Enterprise planning system 12 compares the updated aggregate data to respective target data defined by analysts 18 to determine whether the aggregated data complies with the targets (64). For example, enterprise planning system 12 may compare contribution data associated with salary planning with the salary targets defined by the human resources manager and compares contribution data associated with revenue planning with the revenue targets defined by the chief financial officer. When the aggregated data does comply with the targets, i.e., is below a target threshold or within a target range, enterprise planning system 12 proceeds to the next reconciliation level (66). When there are no more reconciliation levels the enterprise planning session is complete.

However, when the aggregated data does not comply with the targets enterprise planning system 12 notifies the appropriate reviewer (68). For example, when aggregated salary planning data input by a contributor 22 exceeds a defined salary target, enterprise planning system 12 may notify a human resources staff member associated with a higher level node and designated as a reviewer. On the other hand, when the aggregated revenue planning data input by contributor 22 exceeds a defined revenue target, enterprise planning system 12 notifies a finance staff member associated with a higher node. In this manner, depending on the target that aggregated data is not within the reconciliation route may differ. Enterprise planning system 12 may, for example, notify reviewer 20 via electronic mail (email).

Reviewers 20 may access enterprise planning system 12 and immediately provide review input either rejecting or accepting the contribution data and the aggregate totals in view of the target data provided by analysts 18 (68). When reviewers 20 reject the contribution data, enterprise planning system 12 sends the contribution data back to contributor 22 that input the contribution data (72, 74). Contributor 22 may then revise the contribution data and resubmit the revised contribution data.

When reviewer 20 accepts the contribution data, enterprise planning system 12 proceeds to the next reconciliation level (72, 66). When there are no more reconciliation levels the enterprise planning session is complete.

Various embodiments of the invention have been described. These and other embodiments are within the scope of the following claims.

The invention claimed is:

1. A computer-implemented method comprising:
receiving model data from a subset of enterprise users associated with a multi-level enterprise hierarchy that includes a plurality of hierarchically arranged nodes, wherein the model data defines, for at least a group of nodes in the plurality of hierarchically arranged nodes, two or more sub-models that collectively define a set of sub-nodes for the group of nodes, wherein the two or more sub-models are associated with different planning activities, wherein each particular node in the group of nodes includes two or more of its own sub-nodes corresponding to the different planning activities, wherein each particular node in the group of nodes and its corresponding two or more sub-nodes are located in the same level of the multi-level enterprise hierarchy, and wherein each sub-node of any particular node in the group of nodes is associated with a different one of the different planning activities;
combining, by at least one computer, the two or more sub-models defined by the model data to obtain a single enterprise planning model that incorporates the different planning activities associated with the two or more sub-models; and
executing, by the at least one computer, one enterprise planning session in accordance with the obtained enterprise planning model, wherein executing the one enterprise planning session includes:
receiving contribution data from enterprise users associated with sub-nodes of a node in the group of nodes, wherein the node and the sub-nodes of the node are collectively located in a first level that is higher than a lowest level of the multi-level enterprise hierarchy, wherein the received contribution data represents contribution data for each of the different planning activities of the two or more sub-models, and wherein the sub-nodes of the node are each associated with a different one of the different planning activities;
aggregating the received contribution data such that the received contribution data of the different planning activities is combined; and
reconciling the aggregated contribution data for the different planning activities for the node in the first level with target data that combines targets for the different planning activities for the node.

2. The method of claim 1, wherein the subset of enterprise users are associated with a common node of the multi-level enterprise hierarchy.

3. The method of claim 2, wherein the common node with which the subset of enterprise users is associated is a node at a highest level of the multi-level enterprise hierarchy.

4. The method of claim 1, wherein each enterprise user of the subset of enterprise users is associated with at least one sub-node.

5. The method of claim 1, wherein receiving model data from the subset of enterprise users includes:
receiving model data from a first enterprise user defining a first sub-model of the two or more sub-models for a first planning activity; and
receiving model data from a second enterprise user defining a second sub-model of the two or more sub-models for a second planning activity, wherein the second planning activity is different than the first planning activity.

6. The method of claim 1, wherein receiving model data from the subset of enterprise users includes receiving model data that defines corporate target data for each of the different planning activities.

7. The method of claim 1, wherein receiving model data from the subset of enterprise users includes receiving model data that defines templates for collecting contribution data.

8. The method of claim 1, wherein receiving model data from the enterprise users includes receiving model data that assigns one or more enterprise users to each sub-node.

9. The method of claim 1, further comprising combining the two or more sub-models to obtain an enterprise planning model that incorporates two or more planning activities, wherein the combining includes aggregating the two or more sub-models into a common repository that may be accessed enterprise-wide.

10. The method of claim 1, wherein the model data input by each of the enterprise users of the subset of enterprise users is constrained by the model data input by the other enterprise users of the subset.

11. The method of claim 1, further comprising receiving model data from another subset of enterprise users associated with a lower level of the multi-level enterprise hierarchy to refine the model data received from the subset of enterprise users associated with a higher level of the multi-level enterprise hierarchy.

12. The method of claim 11, wherein the model data received from the subset of enterprise users associated with the lower level of the multi-level enterprise hierarchy is constrained by the model data defined by the subset of enterprise users associated with the higher level of the multi-level enterprise hierarchy.

13. The method of claim 1, further comprising:
aggregating contribution data for the different planning activities across the first level of the multi-level enterprise hierarchy to obtain separate aggregated contribution data for each of the different planning activities;
reconciling the separate aggregated contribution data for each of the different planning activities with respective aggregated target data associated with each different planning activity.

14. The method of claim 13, further comprising:
determining whether the aggregated contribution data that combines the contribution data of the different planning activities for the node complies with the combined target data for the different planning activities for the node;
determining whether the separate aggregated contribution data complies with the respective aggregated target data; and
proceeding to a next higher level of the enterprise hierarchy when the aggregated contribution data that combines the contribution data of the different planning activities complies with the combined target data for the two or more different planning activities and the separate aggregated contribution data of each of the different planning activities complies with the respective aggregated target data for each different planning activity.

15. The method of claim 14, wherein determining whether the separate aggregated contribution data complies with respective aggregated target data includes comparing aggregated contribution data associated with each of the different planning activities with respective target data for the planning activity.

16. The method of claim 14, further comprising selecting an enterprise user to view contribution data based on the planning activity target data with which the aggregated contribution data does not comply.

17. The method of claim 16, further comprising:
receiving a rejection from the enterprise user viewing the contribution data; and
notifying the enterprise user that input the contribution data of the rejection.

18. The method of claim 1, wherein the different planning activities include at least two of revenue planning, salary planning, and expense planning.

19. The method of claim 1, wherein each enterprise user of the subset is associated with a common node of the enterprise hierarchy, and receiving model data comprises presenting an interface to receive data from the enterprise users concurrently.

20. The method of claim 19, wherein presenting an interface to receive data from the users includes:
presenting an interface to receive data that define a first sub-model for a first planning activity from a first enterprise user associated with the common node; and
concurrently presenting an interface to receive data that defines a second sub-model for a second planning activity from a second enterprise user associated with the common node.

21. The method of claim 1, wherein the network comprises one of a local area network, a wide area network, and a wireless area network.

22. A system comprising:
at least one computer;
an analysis module, executable by the at least one computer, to interact with a subset of enterprise users to obtain model data that defines a single enterprise planning model for a multi-level enterprise hierarchy that includes a plurality of hierarchically arranged nodes, wherein the model data defines, for at least a group of nodes in the plurality of hierarchically arranged nodes, two or more sub-models that collectively define a set of sub-nodes for the group of nodes, wherein the two or more sub-models are associated with different planning activities, wherein each particular node in the group of nodes includes two or more of its own sub-nodes corresponding to the different planning activities, wherein each particular node in the group of nodes and its corresponding two or more sub-nodes are located in the same level of the multi-level enterprise hierarchy, wherein each sub-node of any particular node in the group of nodes is associated with a different one of the different planning activities, and wherein the analysis module combines the two or more sub-models defined by the model data to obtain the single enterprise planning model that incorporates the different planning activities associated with the two or more sub-models;
a database to store the obtained model data that defines the single enterprise planning model, wherein the system executes one enterprise planning session in accordance with the model data stored in the database; and
a contribution module, executable by the at least one computer, that:
receives contribution data from enterprise users associated with sub-nodes of a node in the group of nodes, wherein the node and the sub-nodes of the node are collectively located in a first level that is higher than a lowest level of the multi-level enterprise hierarchy, wherein the received contribution data represents contribution data for each of the different planning activities of the two or more sub-models, and wherein the sub-nodes of the node are each associated with different one of the different planning activities;
aggregates the received contribution data such that the received contribution data of the different planning activities is combined; and
reconciles the aggregated contribution data for the different planning activities for the node in the first level with target data that combines targets for the different planning activities for the node.

23. The system of claim 22, wherein the subset of enterprise users are associated with a common node of the multi-level enterprise hierarchy.

24. The system of claim 23, wherein the common node with which the subset of enterprise users is associated is a node at a highest level of the multi-level enterprise hierarchy.

25. The system of claim 23, wherein each of the enterprise users of the subset is associated with at least one sub-node.

26. The system of claim 22, wherein the analysis module obtains data that defines a first sub-model of the two or more sub-models for a first enterprise planning activity, and obtains data that defines a second sub-model of the two or more sub-models for a second enterprise planning activity.

27. The system of claim 22, wherein the model data received from the subset of enterprise users defines corporate target data for each of the different planning activities associated with the two or more sub-models.

28. The system of claim 22, wherein the model data received from the subset of enterprise users defines templates for collecting contribution data.

29. The system of claim 22, wherein the model data received from the subset of enterprise users assigns one or more enterprise users with each sub-node.

30. The system of claim 22, wherein the analysis module aggregates the two or more sub-models defined by the model data into the database, which can be accessed enterprise-wide.

31. The system of claim 22, wherein the analysis module constrains the model data input by each of the enterprise users by the model data input by the other enterprise users of the subset.

32. The system of claim 22, wherein the analysis module receives model data from another subset of enterprise users associated with a lower level of the enterprise hierarchy to refine the model data received from the subset of enterprise users associated with a higher level of the enterprise hierarchy.

33. The system of claim 32, wherein the analysis module constrains the model data received from the subset of enterprise users associated with the lower level of the enterprise hierarchy by the model data defined by the subset of enterprise users associated with the higher level.

34. The system of claim 22, wherein the contribution module:
aggregates contribution data for the different planning activities across the first level of the multi-level enterprise hierarchy to obtain separate aggregated contribution data for each of the different planning activities;
reconciles the separate aggregated contribution data for each of the different planning activities with respective aggregated target data.

35. The system of claim 22, wherein the contribution module:
determines whether the aggregated contribution data that combines the contribution data of the different planning activities for the node complies with the combined target data for the two or more different planning activities for the node;
determines whether the separate aggregated contribution data complies with the respective aggregated target data; and
proceeds to a next higher level of the enterprise hierarchy when the aggregated contribution data that combines the contribution data of the different planning activities complies with the combined target data for the different planning activities and the separate aggregated contribution data of each of the different planning activities complies with the respective aggregated target data for each different planning activity.

36. The system of claim 35, wherein the contribution module compares the aggregated contribution data associated with each of the different planning activities with respective target data for each of the different planning activities to determine whether the aggregated data complies with target data.

37. The system of claim 22, wherein the contribution data is stored in the database and the contribution module interacts with enterprise users to allow for review of the aggregated data.

38. The system of claim 37, wherein the contribution module interacts with the enterprise users to allow review of the contribution data when the aggregated data does not comply with the target data.

39. The system of claim 22, wherein the contribution module selects an enterprise user to review the aggregated data based on the planning activity target data the aggregated data does not comply with.

40. The system of claim 22, wherein the enterprise planning activities defined by the set of enterprise users include at least two of revenue planning, salary planning, and expense planning.

41. A computer-readable storage medium comprising instructions for causing one or more computers to:
receive model data from a subset of enterprise users associated with a multi-level enterprise hierarchy that includes a plurality of hierarchically arranged nodes, wherein the model data defines, for at least a group of nodes in the plurality of hierarchically arranged nodes, two or more sub-models that collectively define a set of sub-nodes for the group of nodes, wherein the two or more sub-models are associated with different planning activities, wherein each particular node in the group of nodes includes two or more of its own sub-nodes corresponding to the different planning activities, wherein each particular node in the group of nodes and its corresponding two or more sub-nodes are located in the same level of the multi-level enterprise hierarchy, and wherein each sub-node of any particular node in the group of nodes is associated with a different one of the different planning activities;
combine the two or more sub-models defined by the model data to obtain a single enterprise planning model that incorporates the different planning activities associated with the two or more sub-models; and
execute one enterprise planning session in accordance with the obtained enterprise planning model, wherein the instructions to execute the one enterprise planning session include instructions to:
receive contribution data from enterprise users associated with sub-nodes of a node in the group of nodes, wherein the node and also the sub-nodes of the node are collectively located in a first level that is higher than a lowest level of the multi-level enterprise hierarchy, wherein the received contribution data represents contribution data for each of the different planning activities of the two or more sub-models, and wherein the sub-nodes of the node are each associated with a different one of the different planning activities;
aggregate the received contribution data such that the received contribution data of the different planning activities is combined; and
reconcile the aggregated contribution data for the different planning activities for the node in the first level with target data that combines targets for the different planning activities for the node.

* * * * *